United States Patent
Tsutsui et al.

(10) Patent No.: US 9,184,669 B2
(45) Date of Patent: Nov. 10, 2015

(54) POWER SUPPLY APPARATUS

(71) Applicant: DAIKIN INDUSTRIES, LTD., Osaka-shi, Osaka (JP)

(72) Inventors: Yasuyuki Tsutsui, Kusatsu (JP); Mitsuru Imoto, Kusatsu (JP); Norio Sakae, Kusatsu (JP); Kouji Joutaki, Kusatsu (JP); Keisuke Fukada, Kusatsu (JP); Tetsuo Shouji, Kusatsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/416,595

(22) PCT Filed: May 16, 2013

(86) PCT No.: PCT/JP2013/063683
§ 371 (c)(1),
(2) Date: Jan. 22, 2015

(87) PCT Pub. No.: WO2014/017146
PCT Pub. Date: Jan. 30, 2014

(65) Prior Publication Data
US 2015/0188445 A1    Jul. 2, 2015

(30) Foreign Application Priority Data
Jul. 23, 2012 (JP) ................................ 2012-162887

(51) Int. Cl.
*H02M 5/458* (2006.01)
*H02H 3/08* (2006.01)
(Continued)

(52) U.S. Cl.
CPC .............. *H02M 5/4585* (2013.01); *H02H 1/06* (2013.01); *H02H 3/08* (2013.01); *H02J 1/00* (2013.01); *H02P 29/02* (2013.01); *H02P 29/022* (2013.01)

(58) Field of Classification Search
CPC ....... H02M 5/4585; H02M 1/14; H02P 29/02; H02P 29/022; H02P 29/00; H02H 1/00; H02H 3/08; H02H 1/06; F24F 11/00; F24F 11/02
USPC ................... 363/21.03, 46, 52, 34, 108, 109; 323/317, 326; 320/150, 114, 115, 138
See application file for complete search history.

(56) References Cited
U.S. PATENT DOCUMENTS 5,289,046 A * 2/1994 Gregorich et al. .............. 307/66
6,347,028 B1 * 2/2002 Hausman et al. ............ 361/93.1
(Continued)

FOREIGN PATENT DOCUMENTS

CN 101272059 A 9/2008
JP 8-79963 A 3/1996
(Continued)

OTHER PUBLICATIONS

Sekimoto et al., "Development of Air Conditioner Compliant to IEC Harmonic Standard by Single-Phase to Three Phase Converter without Electrolytic Capacitors", IEEJ Technical Meeting on Motor Drive, 2011, pp. 51-56, No. MD-11.

*Primary Examiner* — Jessica Han
*Assistant Examiner* — Demetries A. Gibson
(74) *Attorney, Agent, or Firm* — Birch, Stewart, Kolash & Birch, LLP

(57) ABSTRACT

Provided is a technique of detecting not only a main DC voltage but also an auxiliary DC voltage to protect a main rectifier circuit and an auxiliary rectifier circuit. A main power supply circuit drives a load. A main rectifier circuit receives an AC voltage through a first switch to supply the main power supply circuit with a main DC voltage. The first switch is turned off when an overcurrent flows through the main power supply circuit or the load is an overload for the main power supply circuit. A control circuit is supplied with operating power from an auxiliary power supply circuit. An auxiliary rectifier circuit receives the AC voltage while bypassing the first switch to supply the auxiliary power supply circuit with an auxiliary DC voltage. A DC voltage detection circuit detects the main DC voltage and the auxiliary DC voltage.

4 Claims, 3 Drawing Sheets

(51) Int. Cl.
*H02P 29/02* (2006.01)
*H02H 1/06* (2006.01)
*H02J 1/00* (2006.01)

(56) References Cited

U.S. PATENT DOCUMENTS

| | | | |
|---|---|---|---|
| 7,471,525 B2 | 12/2008 | Suzuki et al. | |
| 7,602,158 B1* | 10/2009 | Iacob | 323/231 |
| 7,839,663 B2 | 11/2010 | Suzuki et al. | |
| 8,421,432 B2* | 4/2013 | Hawkes | 323/288 |
| 2004/0228058 A1* | 11/2004 | Mayama et al. | 361/100 |
| 2005/0286181 A1* | 12/2005 | Ochiai | 361/23 |
| 2006/0133120 A1* | 6/2006 | Sato et al. | 363/37 |
| 2008/0231236 A1 | 9/2008 | Watanabe et al. | |
| 2012/0153832 A1* | 6/2012 | Hamamoto et al. | 315/121 |
| 2014/0354073 A1* | 12/2014 | Sadakata et al. | 307/104 |

FOREIGN PATENT DOCUMENTS

| | | |
|---|---|---|
| JP | 2000-69786 A | 3/2000 |
| JP | 2000-111123 A | 4/2000 |
| JP | 2001-241732 A | 9/2001 |
| JP | 2006-67754 A | 3/2006 |
| JP | 2006-304557 A | 11/2006 |
| JP | 2007-116873 A | 5/2007 |
| JP | 2007-325448 A | 12/2007 |
| JP | 2011-10494 A | 1/2011 |

* cited by examiner

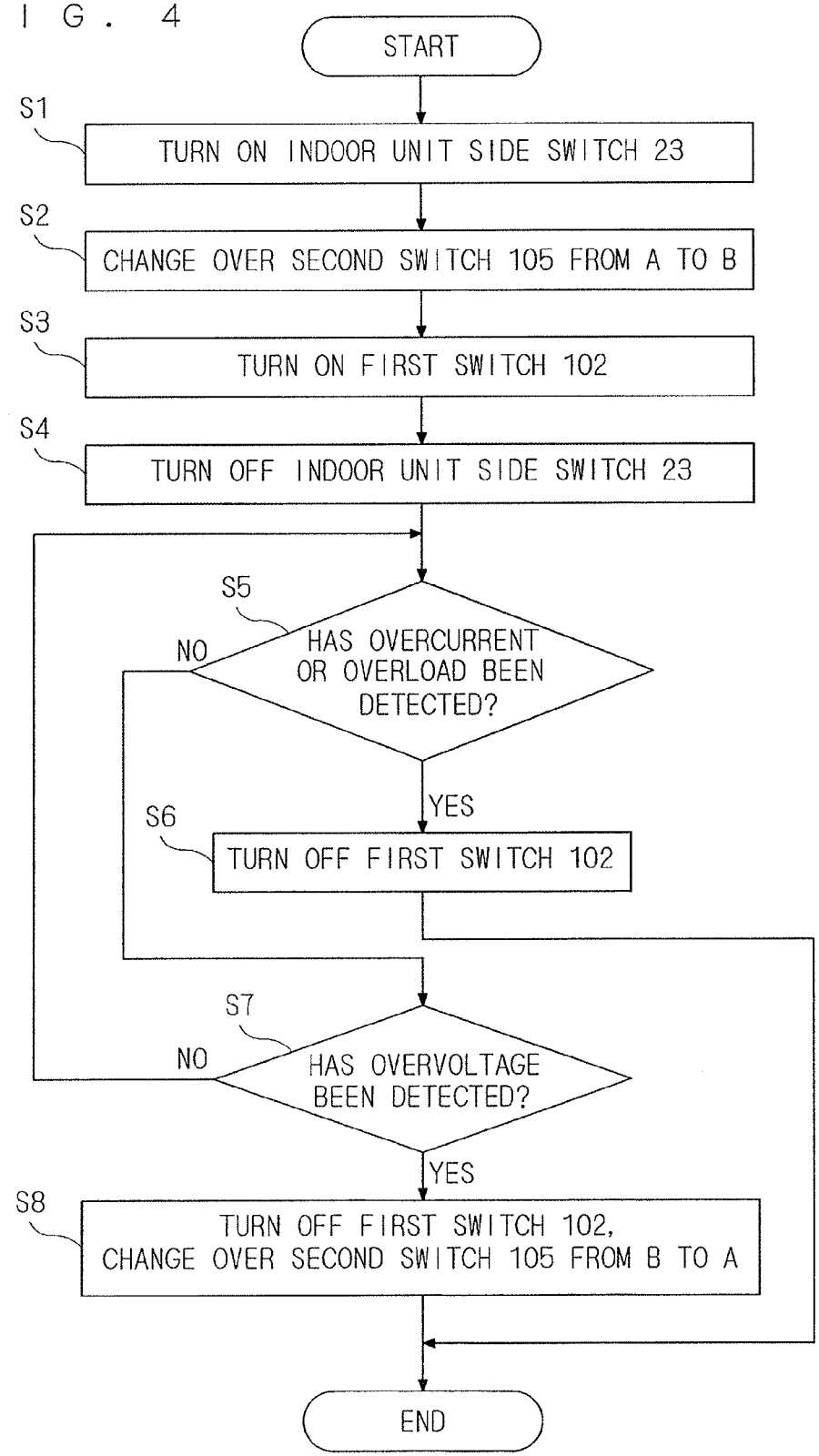

POWER SUPPLY APPARATUS

TECHNICAL FIELD

The present invention relates to a power supply apparatus and is applied to, for example, a power supply apparatus for use in an outdoor unit of an air conditioner.

BACKGROUND ART

An outdoor unit, which configures an air conditioner with an indoor unit, includes a compressor that compresses a refrigerant. The compressor is driven by a motor under the control of a microcomputer that controls the operation of the outdoor unit.

The outdoor unit individually needs a power supply circuit (hereinafter, referred to as a "main power supply circuit") such as an inverter for driving the motor and a power supply circuit (hereinafter, referred to as an "auxiliary power supply circuit") that drives the microcomputer. This is because the motor may stop during the operation of the microcomputer in the outdoor unit.

Thus, a DC voltage (hereinafter, referred to as a "main DC voltage") to be supplied to the main power supply circuit and a DC voltage (hereinafter, referred to as an "auxiliary DC voltage") to be supplied to the auxiliary power supply circuit are generated individually.

In such a situation that the operation of the compressor is not necessary or is inappropriate during the operation of the air conditioner (hereinafter, referred to as a "compressor-stopped situation"), a supply of an auxiliary DC voltage is kept with a supply of a main DC voltage stopped, thereby controlling or protecting the outdoor unit by the microcomputer.

Examples of the case in which the operation of a compressor is not necessary include the time immediately after the start of an air conditioner and the time during an air conditioning operation (so-called "thermo-off") in which a compressor needs not to be driven. Examples of the case in which the operation of a compressor is inappropriate include the times in which an overvoltage occurs in a main DC voltage, an overcurrent flows through a motor, and the load of a motor becomes excessive.

In compressor-stopped situations other than the case in which an overvoltage occurs in a main DC voltage, it is desirable to keep sensing whether an overvoltage occurs in the main DC voltage by keeping a supply of an auxiliary DC voltage with a supply of the main DC voltage stopped.

As described above, a main DC voltage and an auxiliary DC voltage are required individually, and the former is interrupted in the compressor-stopped situation. Upon such a request, which is one of the factors, a main DC voltage and an auxiliary DC voltage are generated by individual rectifier circuits (hereinafter, which are respectively referred to as a "main rectifier circuit" and an "auxiliary rectifier circuit").

Meanwhile, for the reason of design, such as fewer parts, a main DC voltage and an auxiliary DC voltage are generated by a common AC power supply. Then, to stop a supply of the main DC voltage and keep a supply of the auxiliary DC voltage even in a compressor-stopped situation, a power switch is provided to the AC input side of the main rectifier circuit. In contrast, an AC voltage is input to the AC input side of the auxiliary rectifier circuit while bypassing the power switch.

In the known techniques, as described above, the common AC power supply feeds power to the main power supply circuit through the power switch and to the auxiliary power supply circuit while bypassing the power switch. For example, Japanese Patent Application Laid-Open No. 2000-111123 describes and illustrates such a technique.

Japanese Patent Application Laid-Open No. 2000-69786, Japanese Patent Application Laid-Open No. 2011-10494 and Japanese Patent Application Laid-Open No. 08-79963 (1996) are cited here as the prior art documents that describe and illustrate an overvoltage detection circuit. In addition, Sekimoto and four others, "Development of Air Conditioner Compliant to IEC Harmonic Standard by Single-Phase to Three Phase Converter without Electrolytic Capacitors," IEEJ Technical Meeting on Motor Drive, No. MD-11, pp. 51-56 (2011) is cited as the prior art documents that describe the control of a so-called inverter without electrolytic capacitor.

SUMMARY OF INVENTION

Problem to be Solved by the Invention

As described above, the common AC power supply feeds power to the main rectifier circuit and the auxiliary rectifier circuit. This leads to a risk that if voltage fluctuates excessively in the AC power supply, not only an overvoltage may occur in a main DC voltage, but also an overvoltage may occur in an auxiliary DC voltage. In such a case, power feeding from the AC power supply to the auxiliary rectifier circuit is desirably interrupted to protect the auxiliary rectifier circuit and a part to be supplied with an auxiliary DC voltage, for example, a microcomputer.

Therefore, a first object of the present invention is to provide a technique of detecting not only a main DC voltage but also an auxiliary DC voltage to protect a main rectifier circuit and an auxiliary rectifier circuit.

In response to requests for cost and size reductions, it has been recently proposed to omit an electrolytic capacitor having large capacitance from the configuration for obtaining a main DC voltage. This leads to conspicuous pulsation of the main DC voltage, but this pulsation can be handled by appropriately controlling the inverter receiving the main DC voltage. The magnitude of the required power completely differs between the main DC voltage and the auxiliary DC voltage. Contrastingly, an electrolytic capacitor, which is required from its intended use, is provided for the configuration for obtaining the auxiliary DC voltage.

Therefore, a second object of the present invention is to provide a technique of detecting a main DC voltage and an auxiliary DC voltage while avoiding interference between these voltages.

Means to Solve the Problem

A first aspect of a power supply apparatus according to the present invention includes a main power supply circuit (119) that drives a load (121), a first switch (102) that is turned off when an overcurrent flows through the main power supply circuit or the load is an overload for the main power supply circuit, a main rectifier circuit (11) that receives an AC voltage through the first switch to supply the main power supply circuit with a main DC voltage (Vdc1), an auxiliary power supply circuit (117) that supplies a control circuit (123) that controls the first switch with operating power, an auxiliary rectifier circuit (12) that receives the AC voltage while bypassing the first switch to supply the auxiliary power supply circuit with an auxiliary DC voltage (Vdc2), and a DC voltage detection circuit (13) that detects the main DC voltage and the auxiliary DC voltage.

In a second aspect of the power supply apparatus according to the present invention, in the first aspect, the main power supply circuit includes an inverter that supplies an AC output voltage from the main DC voltage to the load, the main rectifier circuit includes a first capacitor (107) that absorbs a switching ripple of the inverter, and the auxiliary rectifier circuit includes a second capacitor (110) that smoothes the auxiliary DC voltage.

A third aspect of the power supply apparatus according to the present invention, in the second aspect, further includes a diode (111) having an anode connected to a high-potential side end of the first capacitor and a cathode connected to a high-potential side end of the second capacitor, in which the DC voltage detection circuit detects a potential of the cathode of the diode.

A fourth aspect of the power supply apparatus according to the present invention, in the third aspect, further includes a resistor (112) located between the cathode of the diode and the high-potential side end of the second capacitor.

A fifth aspect of the power supply apparatus according to the present invention, in any one of the first to fourth aspects, further includes a second switch (105) separate from the first switch, the second switch being turned off upon determination that an overvoltage has occurred in the AC voltage based on a detection result of the DC voltage detection circuit, in which the auxiliary rectifier circuit (12) receives the AC voltage through the second switch, and the first switch is also turned off by the control circuit (123) upon determination that an overvoltage has occurred in the AC voltage.

Effects of the Invention

According to the first aspect of the power supply apparatus of the present invention, when an overcurrent flows through the main power supply circuit or the load is an overload for the main power supply circuit, the first switch is turned off to protect the main rectifier circuit and the main power supply circuit. Even in such a case, the auxiliary DC voltage is kept, allowing the DC voltage detection circuit to detect whether an abnormal voltage has occurred in the AC voltage.

According to the second aspect of the power supply apparatus of the present invention, the main power supply circuit includes the inverter, allowing the rectifier circuit to include a first capacitor having small capacitance while including no smoothing capacitor. This reduces the size and cost of the power supply apparatus. The auxiliary rectifier circuit includes the second capacitor having a smoothing function, eliminating the need for the auxiliary power supply circuit to perform complicated control, differently from the inverter of the main power supply circuit.

According to the third aspect of the power supply apparatus of the present invention, the main rectifier circuit and the main power supply circuit are protected from a sudden rise of the main DC voltage when the load is stopped. Moreover, the second capacitor can reduce its capacitance compared to the case in which no diode is provided. The DC voltage detection circuit detects the potential of the cathode of the diode, and accordingly, even if the first switch is turned off to interrupt a supply of the main DC voltage, the auxiliary DC voltage can be detected to determine whether an abnormality has occurred in the AC voltage.

According to the fourth aspect of the power supply apparatus of the present invention, interference is reduced, in which fluctuations of voltage detected in the main DC voltage are smoothed by the second capacitor.

According to the fifth aspect of the power supply apparatus of the present invention, not only the main rectifier circuit and the main power supply circuit but also the auxiliary rectifier circuit and the auxiliary power supply circuit are protected because the first switch and the second switch are both turned off when it is determined that an overvoltage has occurred in the AC power supply.

These and other objects, features, aspects and advantages of the present invention will become more apparent from the following detailed description of the present invention when taken in conjunction with the accompanying drawings.

BRIEF DESCRIPTION OF DRAWINGS

FIG. 4 is a flowchart showing the on/off operation of each switch.

DESCRIPTION OF EMBODIMENT

Figure 1:
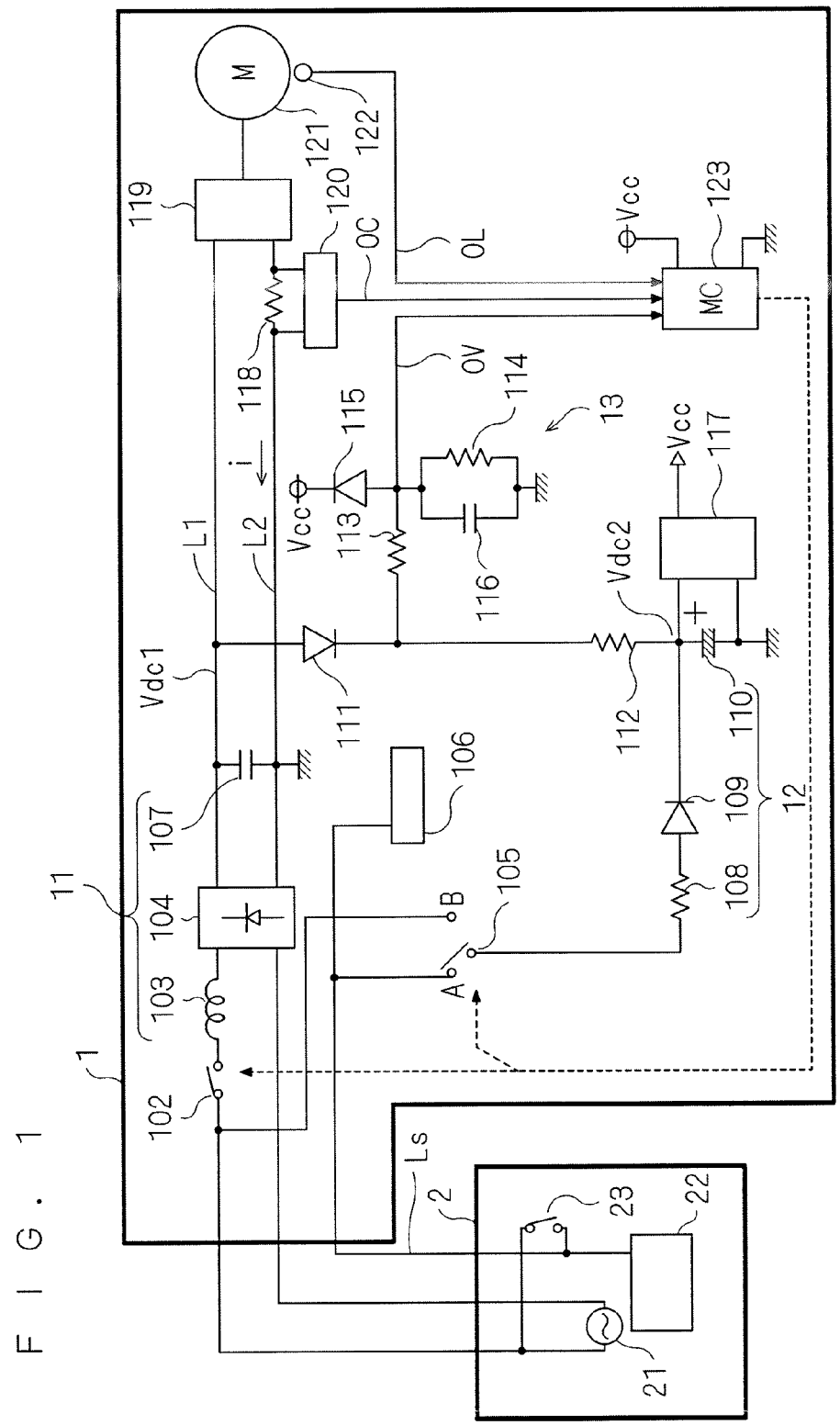
FIG. 1 is a circuit diagram showing part of an electrical configuration of an air conditioner.

FIG. 1 is a circuit diagram showing part of an electrical configuration of an air conditioner including an outdoor unit 1 and an indoor unit 2. The indoor unit 2 includes an AC power supply 21, a communication circuit 22, and an indoor unit side switch 23. The AC power supply 21 supplies the outdoor unit 1 with an AC voltage.

While the AC power supply 21 can be actually obtained from a commercial power supply, here, it is expressed to be provided in the indoor unit 2. The communication circuit 22 is connected to the outdoor unit 1 through a communication line Ls and sends and receives signals transmitted between the indoor unit 2 and the outdoor unit 1. The indoor unit side switch 23 connects and cuts off the communication line Ls and the AC power supply 21 to and from each other.

The outdoor unit 1 includes components below. A main rectifier circuit 11 receives an AC voltage obtained from the AC power supply 21 through a first switch 102 to supply a main DC voltage Vdc1 between DC buses L1 and L2. Here, the DC bus L2 is grounded and has a potential lower than that of the DC bus L1.

A main power supply circuit 119 is supplied with a main DC voltage Vdc1 through the DC buses L1 and L2 to output the power for driving a load 121. The main power supply circuit 119 includes, for example, an inverter and supplies an AC output voltage to the load 121. The load 121 is, for example, a motor M, and the motor M drives a compressor (not shown). The compressor compresses a refrigerant for use in an air conditioning function.

The main rectifier circuit 11 includes, for example, a diode bridge 104 that performs full-wave rectification, a reactor 103, and a first capacitor 107. The reactor 103 is located between the first switch 102 and the diode bridge 104. The first capacitor 107 is provided between the DC buses L1 and L2 and functions to absorb a switching ripple of the inverter included in the main power supply circuit 119.

The first capacitor 107 does not have large capacitance enough to perform a smoothing function. The main power supply circuit 119 includes an inverter, and thus, can use a capacitor having small capacitance as the first capacitor 107 without using the main rectifier circuit 11. This reduces the size and cost of the apparatus. The control of such an inverter including a capacitor, which is not expected to perform a smoothing function, is commonly referred to as the control of an inverter without electrolytic capacitor, and is described in, for example, Sekimoto and four others, "Development of Air Conditioner Compliant to IEC Harmonic Standard by Single- Phase to Three Phase Converter without Electrolytic Capacitors," IEEJ Technical Meeting on Motor Drive, No. MD-11, pp. 51-56 (2011).

An auxiliary rectifier circuit 12 receives an AC voltage while bypassing the first switch 102 to supply an auxiliary DC voltage Vdc2. The auxiliary power supply circuit 117 receives the auxiliary DC voltage Vdc2 and supplies a control circuit 123 with a potential Vcc that will serve as the operating power therefor.

The auxiliary rectifier circuit 12, for example, includes a resistor 108, a diode 109, and a second capacitor 110, and performs half-wave rectification. The auxiliary rectifier circuit 12 receives an AC voltage through a second switch 105. More specifically, an anode of the diode 109 is connected to the second switch 105 through the resistor 108, and the second capacitor 110 is provided between a cathode of the diode 109 and the ground. The voltage across the second capacitor 110 is the auxiliary DC voltage Vdc2.

The second capacitor 110 has a smoothing function. Thus, the auxiliary power supply circuit 117 needs not to perform complicated control, differently from the main power supply circuit 119. In general, the power required for the auxiliary power supply circuit 117 is smaller than the power required for the main power supply circuit 119, and accordingly, the capacitance of the second capacitor 110 is smaller than the capacitance of a capacitor that is provided between the DC buses L1 and L2 and performs a smoothing function. In other words, even if the second capacitor 110 is provided for smoothing, there is no serious damage to the advantages (reductions in size and cost) obtained by providing no capacitor that performs a smoothing function between the DC buses L1 and L2.

A resistor 118 for current detection is provided in the DC bus L2. A voltage drop in the resistor 118 is measured by a current detection circuit 120, and a signal OC indicative of a value of a current i flowing through the DC bus L2 is output from the current detection circuit 120. The current i can be regarded as the current flowing through the main power supply circuit 119, and thus, whether an overcurrent has flowed through the main power supply circuit 119 can be determined by examining the signal OC.

A temperature detection element 122 provides information OL regarding whether the temperature of the load 121 exceeds a predetermined temperature. For example, the temperature detection element 122 is a bimetallic element, and the information OL corresponds to a binary dependent on on/off of the bimetallic element. It is sensed that upon the temperature of the load 121 exceeding the predetermined temperature, the load 121 is overloaded for the main power supply circuit 119.

The control circuit 123 controls the operation of the main power supply circuit 119 and also controls on/off of the first switch 102 based on the signal OC and the information OL. Specifically, the control circuit 123 determines whether the above-mentioned overcurrent or the above-mentioned overload has occurred and, if the determination is positive, turns off the first switch 102. Consequently, the main rectifier circuit 11 and the main power supply circuit 119 are protected.

A DC voltage detection circuit 13 detects a main DC voltage Vdc1 and an auxiliary DC voltage Vdc2. Here, the DC voltage detection circuit 13 includes a voltage divider circuit formed of resistors 113 and 114. Specifically, the resistor 113 is connected to the DC bus L1 side, and the resistor 114 is provided to the ground side, both of which are connected in series between the DC bus L1 and the ground.

The voltage, obtained as a result of the division of the main DC voltage Vdc1 or the auxiliary DC voltage Vdc2 by the voltage divider circuit, is output as a signal OV from the DC voltage detection circuit 13. The control circuit 123 determines whether an abnormal value has occurred in the main DC voltage Vdc1 or the auxiliary DC voltage Vdc2 based on the signal OV. Examples of the factor that causes an abnormal value include excessive variations in the AC voltage obtained from the indoor unit 2. Examples of the variations include variations in the commercial power supply received by the indoor unit 2.

The auxiliary DC voltage Vdc2 is supplied by the auxiliary rectifier circuit 12 that receives an AC voltage while bypassing the first switch 102. Thus, even if an overcurrent or an overload has been detected so that the first switch 102 is turned off to supply no main DC voltage Vdc1, a supply of the auxiliary DC voltage Vdc2 is kept, allowing the DC voltage detection circuit 13 to keep detection. The DC voltage detection circuit 13 accordingly can detect whether an abnormal voltage has occurred in the AC voltage.

Examples of the case in which the first switch 102 is turned off include the cases of the detections of overcurrent and overload described above, as well as the case of so-called "thermo-off." To protect a compressor (not shown) that is driven by the load 121, it is desirable to prohibit the first switch 102 from being turned on again for a predetermined period after the first switch 102 is turned off once.

The DC voltage detection circuit 13 also includes a diode 115 in view of the fact that the control circuit 123 uses a potential Vcc as its operating power. A cathode of the diode 115 is supplied with the potential Vcc and an anode thereof is connected to a junction between the resistors 113 and 114 (the signal OV is obtained from this junction). Thus, the maximum voltage of the signal OV is almost limited to the potential Vcc, making it easier for the control circuit 123 to detect the presence or absence of an abnormal voltage value. Further, a capacitor 116, which is connected in parallel with the resistor 114, removes noise.

It is recognized that the first switch 102, the main rectifier circuit 11, the auxiliary rectifier circuit 12, the main power supply circuit 119, the auxiliary power supply circuit 117, and the DC voltage detection circuit 13 form a power supply apparatus that supplies a main DC voltage Vdc1 and an auxiliary DC voltage Vdc2. Moreover, the second switch 105 may be recognized as a component of the power supply apparatus, and the operation thereof will be described below in detail.

The power supply apparatus desirably includes a diode 111 described below. Specifically, an anode of the diode 111 is connected to the high-potential side end of the first capacitor 107 (end on DC bus L1 side) and a cathode thereof is connected to the high-potential side end of the second capacitor 110. The DC voltage detection circuit 13 detects the potential of the cathode of the diode 111. Specifically, the resistor 113 is connected to the cathode of the diode 111.

If no diode 111 is provided and the high-potential side end of the first capacitor 107 is not connected with the high-potential side end of the second capacitor 110, stopping the load 121 causes the main DC voltage Vdc1 to rise more than during the normal operation. This is remarkable due to a small capacitance of the first capacitor 107.

Contrastingly, if the high-potential side end of the first capacitor 107 is connected with the high-potential side end of the second capacitor 110 without using the diode 111, the second capacitor 110 needs large capacitance, making it meaningless to reduce the capacitance of the first capacitor 107.

Therefore, providing the diode 111 causes the second capacitor 110 to absorb a sharp rise in the main DC voltage Vdc1 when the load 121 is stopped, protecting the main rectifier circuit 11 and the main power supply circuit 119 from the sharp rise. Besides, the second capacitor 110 is not caused to perform a function of smoothing the main DC voltage Vdc1 during the normal operation, reducing the capacitance of the second capacitor 110.

The DC voltage detection circuit 13 detects the potential of the cathode of the diode 111, and thus, even if the first switch 102 is turned off to interrupt a supply of the main DC voltage Vdc1, an auxiliary DC voltage Vdc2 is detected, determining whether an abnormality has occurred in the AC voltage.

The power supply apparatus more desirably includes a resistor 112 described below. Specifically, the resistor 112 is located between the cathode of the diode 111 and the high-potential side end of the second capacitor 110. The resistor 112 prevents rush current when the second capacitor 110 is caused to absorb a sharp rise in the main DC voltage Vdc1, due to the first switch 102 being turned off. Also, during the normal operation, such interference is reduced that variations in voltage detected in the main DC voltage Vdc1 are unfortunately smoothed by the second capacitor 110.

The second switch 105 is desirably a change-over switch. Here, a common end of the second switch 105 is connected to the anode of the diode 109 through the resistor 108. The common end of the second switch 105 is exclusively connected to any one of an end A of the second switch 105 and an end B of the second switch 105.

When it is determined that an overvoltage has occurred in AC voltage based on the signal OV, the control circuit 123 not only turns off the first switch 102 but also cuts off the common end of the second switch 105 and the end B of the second switch 105 from each other. Thus, upon determination that an overvoltage has occurred in the AC power supply 21, the first switch 102 and the second switch 105 are both turned off, protecting not only the main rectifier circuit 11 and the main power supply circuit 119 but also the auxiliary rectifier circuit 12 and the auxiliary power supply circuit 117.

The common end of the second switch 105 is normally connected to any one of the end A of the second switch 105 and the end B of the second switch 105 in a complementary manner (as well as in an exclusive manner), and thus, the common end of the second switch 105 and the end A of the second switch 105 are in conduction. The second switch 105, however, may be in a situation in which its common end is not connected to none of the end A and end B of the second switch 105. Description will be given below of an example case in which the common end of the second switch 105 is connected to any one of the end A and end B of the second switch 105 in a complementary manner.

Upon determination that an overvoltage has occurred in AC voltage as described above, the AC power supply 21 does not feed power to the auxiliary rectifier circuit 12 as well, and thus, the auxiliary power supply circuit 117 fails to supply the control circuit 123 with a potential Vcc being operating power. Thus, the control by the control circuit 123 is not used to reactivate the outdoor unit 1 thereafter.

Thus, to reactivate or start the outdoor unit 1, the communication line Ls and the AC power supply 21 are connected using the indoor unit side switch 23 of the indoor unit 2.

The communication line Ls is connected to a communication circuit 106. During the normal operation, the indoor unit side switch 23 is turned off, and the communication line Ls sends and receives signals transmitted between the communication circuit 22 of the indoor unit 2 and the communication circuit 106 of the outdoor unit 1.

The communication line Ls is connected to the end A of the second switch 105 and, upon the indoor unit side switch 23 being turned on, connects the AC power supply 21 to the auxiliary rectifier circuit 12. Thus, the auxiliary power supply circuit 117 supplies the control circuit 123 with a potential Vcc, allowing the control circuit 123 to operate.

For example, a user can perform the operation of turning on the indoor unit side switch 23. However, for appropriate turning off at a timing described below, it is desirable that the operation of turning off the indoor unit side switch 23 be performed automatically under the control of the indoor unit 2 after a lapse of a predetermined period from an on-operation thereof.

Upon start of a supply of the potential Vcc to the control circuit 123, the control circuit 123 turns on the first switch 102 to change over the connection partner of the common end of the second switch 105 from the end A to the end B.

Figure 2:
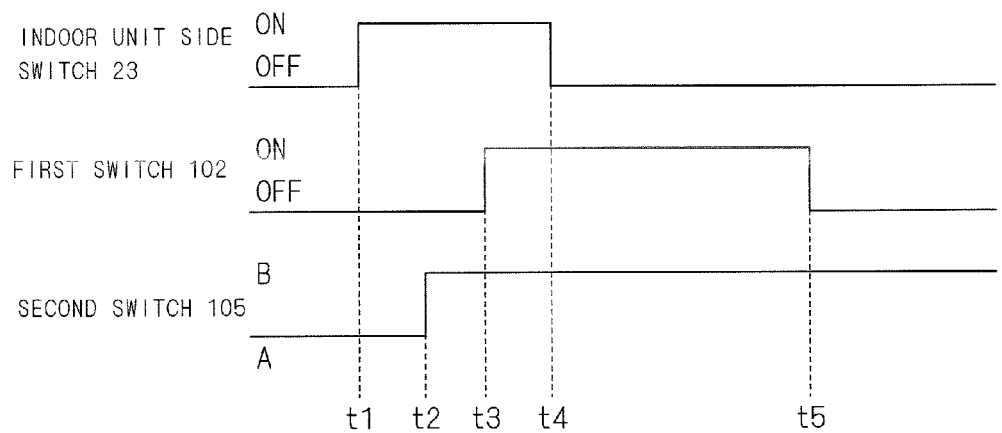
FIGS. 2 and 3 are timing charts showing the operation of each switch when an outdoor unit is started or reactivated.
Figure 3:
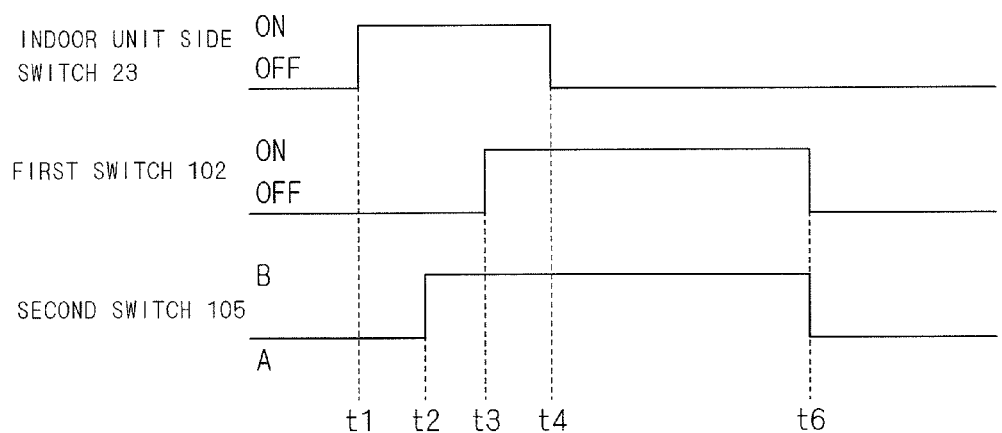

FIGS. 2 and 3 are timing charts showing the operation of each switch when the outdoor unit 1 is started or reactivated. When the indoor unit side switch 23 turns on at a time t1, the control circuit 123 operates and the second switch 105 is changed over at a time t2 (>t1), supplying the auxiliary rectifier circuit 12 with an AC voltage. After that, the first switch 102 is turned on at a time t3 (>t2). Consequently, the main rectifier circuit 11 is also supplied with an AC voltage. After that, the indoor unit side switch 23 turns off at a time t4 (>t3). This is because a failure occurs in the communication between the communication circuits 22 and 106 with the indoor unit side switch 23 turned on.

After that, the indoor unit side switch 23 remains turned off, the first switch 102 remains turned on, and the common end remains connected to the end A in the second switch 105.

With reference to FIG. 2, upon detection of an overcurrent or overload at a time t5 (>t4), the control circuit 123 turns off the first switch 102 while keeping the second switch 105 in the current situation.

With reference to FIG. 3, upon detection of an overvoltage at a time t6 (>t4), the control circuit 123 turns off the first switch 102 to change over the connection destination of the common end of the second switch 105 from the end B to the end A.

FIG. 4 is a flowchart showing the on/off operation of each switch as described above. Of the steps shown in FIG. 4, Steps S1 and S4 are operations on the indoor unit 2 side, while the other steps are operations to be performed under the control of the control circuit 123 in the outdoor unit 1.

Step S1 is the operation at the time t1 in FIGS. 2 and 3, turning on the indoor unit side switch 23. Step S2 is the operation at the time t2 in FIGS. 2 and 3, changing over the connection destination of the common end of the second switch 105 from the end A to the end B. Step S3 is the operation at the time t3 in FIGS. 2 and 3, turning on the first switch 102. Step S4 is the operation at the time t4 in FIGS. 2 and 3, turning off the indoor unit side switch 23.

In Step S5, whether an overcurrent or overload has been detected is determined. If the determination is positive, the process proceeds to Step S6, turning off the first switch 102. This corresponds to the operation at the time t5 in FIG. 2.

If the determination is negative in Step S5, the process proceeds to Step S7, determining whether an overvoltage has been detected. Such determination can be made by the DC voltage detection circuit 13 detecting not only the main DC voltage Vdc1 but also the auxiliary DC voltage Vdc2. If the determination is negative, the process returns to Step S5 to keep a normal operation.

If the determination in Step S7 is positive, the process proceeds to Step S8, not only turning off the first switch 102 but also changing over the connection destination of the common end of the second switch 105 from the end B to the end A. This corresponds to the operation at the time t6 in FIG. 3.

This embodiment can determine not only the main DC voltage Vdc1 but also the auxiliary DC voltage Vdc2 as described above, protecting the main rectifier circuit 11 and the auxiliary rectifier circuit 12.

While the invention has been shown and described in detail, the foregoing description is in all aspects illustrative and not restrictive. It is therefore understood that numerous modifications and variations can be devised without departing from the scope of the invention.

The invention claimed is:

1. A power supply apparatus comprising:
    a main power supply circuit that drives a load;
    a first switch that is turned off when an overcurrent flows through said main power supply circuit or said load is an overload for said main power supply circuit;
    a main rectifier circuit that receives an AC voltage through said first switch to supply said main power supply circuit with a main DC voltage;
    an auxiliary power supply circuit that supplies a control circuit that controls said first switch with operating power;
    an auxiliary rectifier circuit that receives said AC voltage while bypassing said first switch to supply said auxiliary power supply circuit with an auxiliary DC voltage; and
    a DC voltage detection circuit that detects said main DC voltage and said auxiliary DC voltage,
    wherein
    said main power supply circuit includes an inverter that supplies an AC output voltage from said main DC voltage to said load,
    said main rectifier circuit includes a first capacitor that absorbs a switching ripple of said inverter,
    said auxiliary rectifier circuit includes a second capacitor that smoothes said auxiliary DC voltage,
    said power supply apparatus further comprises a diode having an anode connected to a high-potential side end of said first capacitor and a cathode connected to a high-potential side end of said second capacitor, and
    said DC voltage detection circuit detects a potential of said cathode of said diode.

2. The power supply apparatus according to claim 1, further comprising
    a resistor located between said cathode of said diode and said high-potential side end of said second capacitor.

3. The power supply apparatus according to claim 1, further comprising
    a second switch separate from said first switch, said second switch being turned off upon determination that an overvoltage has occurred in said AC voltage based on a detection result of said DC voltage detection circuit, wherein
    said auxiliary rectifier circuit receives said AC voltage through said second switch, and
    said first switch is also turned off by said control circuit upon determination that an overvoltage has occurred in said AC voltage.

4. The power supply apparatus according to claim 3, further comprising
    a second switch separate from said first switch, said second switch being turned off upon determination that an overvoltage has occurred in said AC voltage based on a detection result of said DC voltage detection circuit, wherein
    said auxiliary rectifier circuit receives said AC voltage through said second switch, and
    said first switch is also turned off by said control circuit upon determination that an overvoltage has occurred in said AC voltage.

* * * * *